W. J. MYATT.
TURNBUCKLE AND THE LIKE.
APPLICATION FILED JULY 8, 1919.

1,342,130.

Patented June 1, 1920.
4 SHEETS—SHEET 1.

Inventor
W. J. Myatt,
By H. R. Kerslake
Attorney

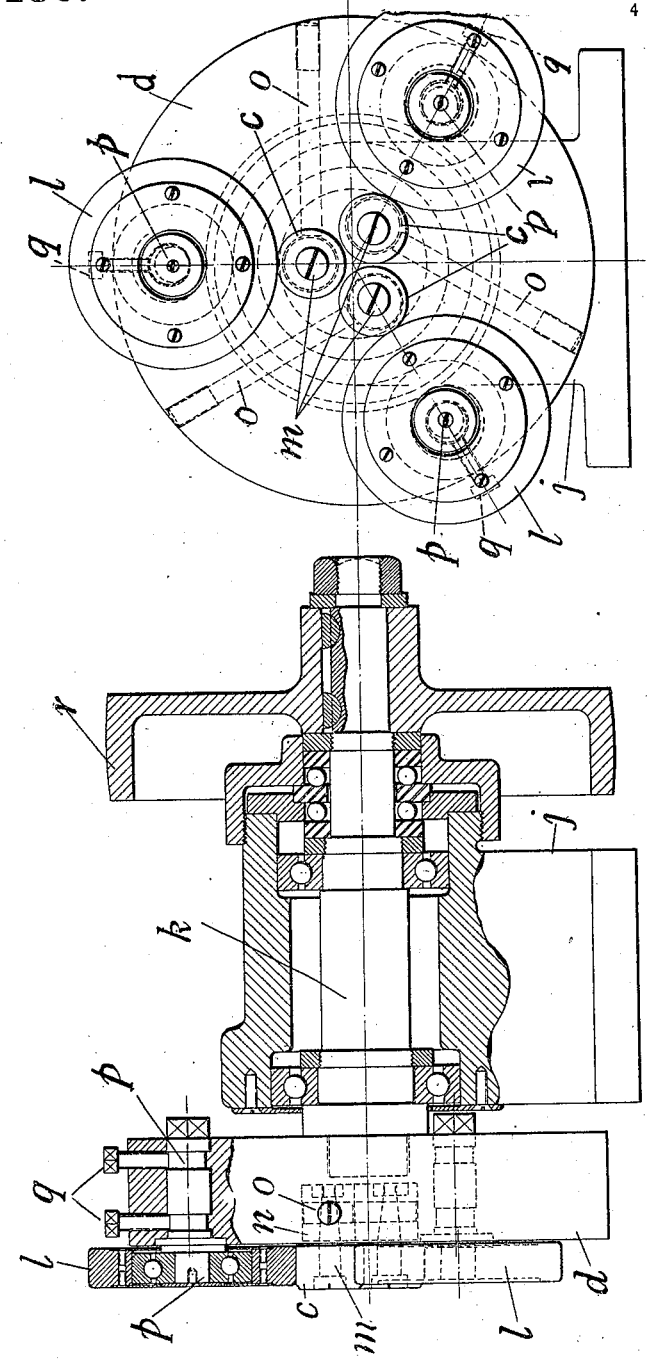

UNITED STATES PATENT OFFICE.

WILLIAM JAMES MYATT, OF BIRMINGHAM, ENGLAND.

TURNBUCKLE AND THE LIKE.

1,342,130.  Specification of Letters Patent.  Patented June 1, 1920.

Application filed July 8, 1919. Serial No. 309,333.

*To all whom it may concern:*

Be it known that I, WILLIAM JAMES MYATT, a subject of the King of Great Britain and Ireland, residing at Argent Works, Frederick street, in the city of Birmingham, England, have invented certain new and useful Improvements Relating to Turnbuckles and the like, of which the following is a specification.

This invention relates to bodies for turnbuckles and like tubular articles which are internally screwed at one or both ends. The object of the invention is to provide improved means for producing the required configuration at the ends of such articles.

In the four accompanying sheets of explanatory drawings:—

Fig. 3 is a part sectional front elevation, and Fig. 4 an end elevation to a larger scale than Figs. 1 and 2 of one of the roll headstocks.

Figure 1:
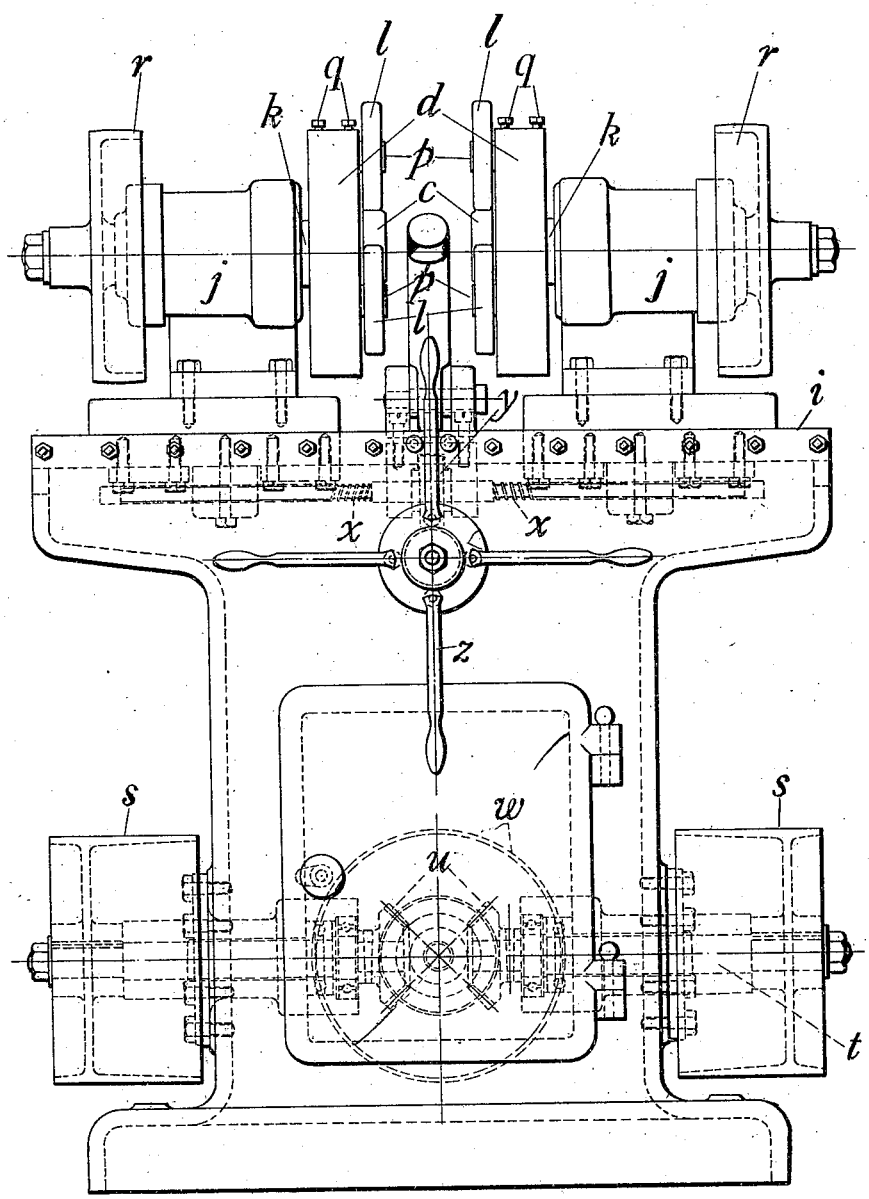
Figure 1 is a front elevation, and Fig. 2 an end elevation of a machine constructed in accordance with this invention.
Figure 2:
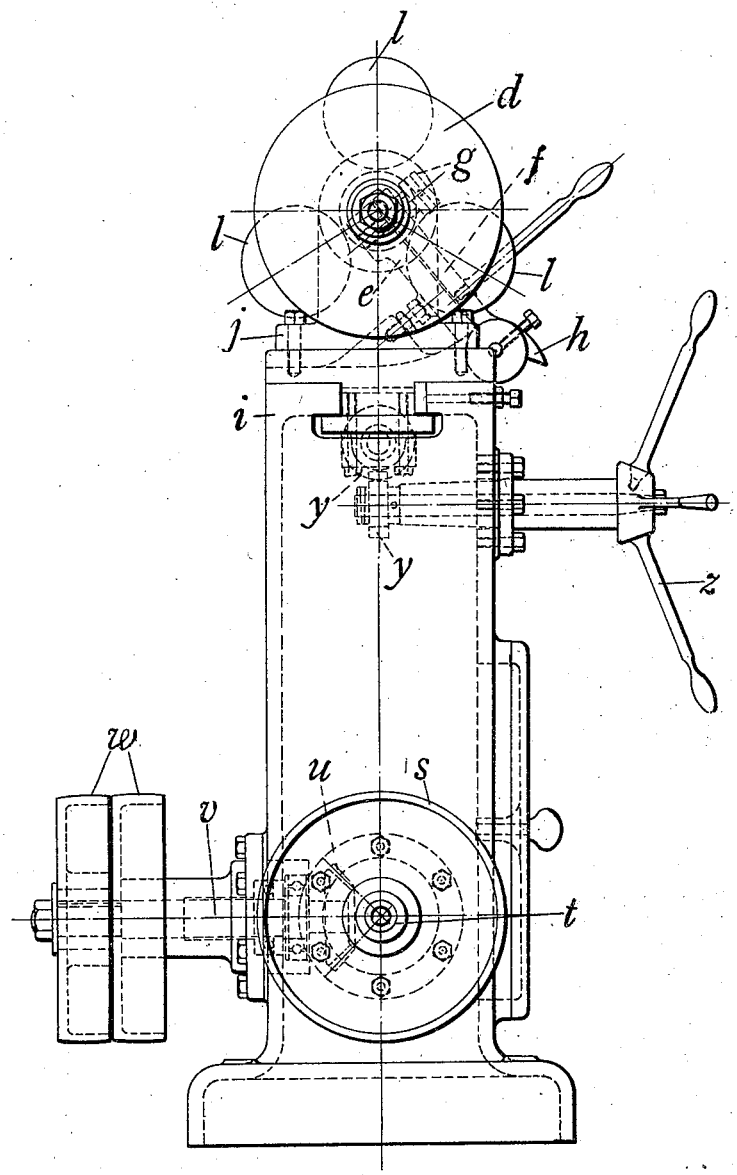
Figure 5:
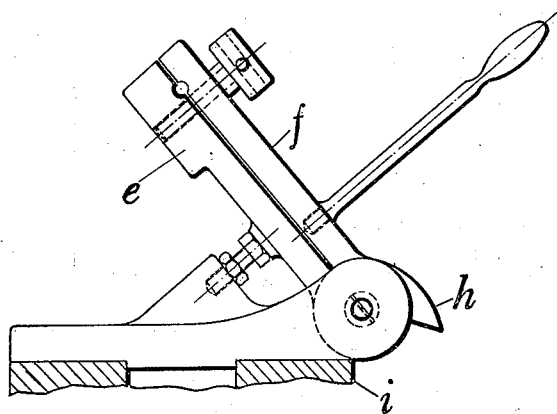
Fig. 5 is an end elevation of the work holding clamp, and Fig. 6 an elevation with half in section of a turnbuckle body after treatment in the machine illustrated.
Figure 6:
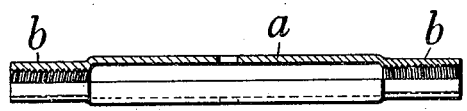

In carrying the invention into effect a steel or other tube $a$ of uniform diameter and thickness is subjected at one or both ends $b$ to a rolling action which without extending the tube effects a small local reduction of outside diameter. This has the effect of reducing the inside diameter and of thickening the wall of the tube at the rolled part or parts sufficiently to enable the same to be internally screwed, leaving the interior of the central or main portion of the tube of the original diameter, which is equal to or rather greater than the outside diameter of the screw or screws used with the body.

The rolling is effected by orbital rolls $c$ carried on rotatable disks $d$. Considering the case of a turnbuckle body which is required to be reduced for internal screwing at both ends, the machine bed $i$ is provided with a clamp in which the tubular body is fixed coaxially with the said disks $d$. The clamp consists of relatively movable and hinged parts $e$ and $f$, the latter being secured to the former by a screw $g$. Movement of the part $f$ when the screw is disconnected is limited by a tail stop $h$ which abuts against the bed $i$. On opposite sides of the clamp are arranged a pair of headstocks $j$ slidably mounted on the bed $i$. Each carries a rotatable spindle $k$. Each spindle is provided at one end with a disk $d$ on which three orbital rolls $c$ are rotatably mounted. The rolls are slightly chamfered at their outer edges so that the adjacent end of the tube can enter between them. Behind each roll is a supporting roll $l$ of larger diameter which relieves the spindles $m$ or bearings $n$ of the working rolls of pressure. Preferably all the rolls are adjustable. In the case of the working rolls this is effected by carrying the spindles $m$ in eccentric bearings $n$, the bearings being locked when set by screws $o$. The rollers $l$ are carried on eccentric ends of spindles $p$ which can be locked by screws $q$. The headstocks are rotated in opposite directions so that the rolls exert opposite torques on the opposite ends of the tubular article to be treated and thereby avoid any necessity for exerting a strong clamping action on the article. Each headstock is driven by its own belt through a pulley $r$ on the headstock spindle, the belt deriving its motion from a pulley $s$ on a driving shaft $t$ at or near the base of the machine. The shafts are driven through bevel gears $u$ from a shaft $v$ fitted with fast and loose belt pulleys $w$.

Movement of the headstocks to or from the tube is effected by right and left hand feeding screws $x$ actuated through spiral gearing $y$ from a hand lever $z$ or wheel.

The orbital rolls $c$ on each headstock are initially adjusted to correspond with the required external diameter of the tube end and are secured in this position, the supporting rolls $l$ being also adjusted to make contact with the rolls $c$. The rolls $c$ are brought into operation by advancing the headstocks against the ends of the tube. The chamfering of the outer edges of the rolls above mentioned just permits the extreme ends of the tubes to enter. During the endwise movements of the headstocks while the rolls are being carried around the tube ends, the latter are gradually compressed or contracted in diameter, and the process is continued until the required length at each end of the tube has been treated. In this operation there is no material extension of the tubes, and the reduction of diameter is consequently accompanied by a thickening of the tube wall with a reduction of internal diameter. This thickening is sufficient to permit the required internal screw threading of the ends in a manner which will leave the central and main portion of the tube clear for the reception of the portions of the externally screwed stems which are provided in conjunction with the body.

For some purposes the body is required to be thickened at one end only, in which case only one headstock is used, or a double length of tube is thickened at both ends and afterward cut in two. The invention is not limited to turnbuckles as it may be applied to other tubular articles requiring to have one or both ends thickened as above described.

Having thus described my invention what I claim as new and desire to secure by Letters Patent is:—

1. Means for reducing the external diameter and thickening the ends of tubular articles, comprising a slidable headstock, a rotary spindle carried in said headstock, a disk secured to said spindle, orbital working and supporting rolls mounted on one face of the disk, means for rotating the spindle and sliding the headstock, and a clamp for supporting the articles coaxially with the spindle, substantially as described.

2. Means for reducing the external diameter and thickening the ends of tubular articles, comprising orbital working and supporting rolls, eccentric supports for said rolls, means for locking the supports, a rotary disk carrying the rolls, and means for holding the articles, coaxially with the axis of rotation of the disk, substantially as described.

3. Means for reducing the external diameter and thickening the ends of tubular articles, comprising a pair of slidable headstocks, a right and left hand screw for producing opposite relative movements of the headstocks, a bed supporting said headstocks, means for rotating the screw, a spindle in each headstock, a disk secured to one end of said spindle, working and supporting rolls on one face of the disk, a clamp between the headstocks, a driving belt pulley on each spindle, complementary driving pulleys, shafts for the latter, a common driving shaft, and gear wheels transmitting opposite rotational movements from the common shaft to the shafts carrying said complementary driving pulleys, substantially as described.

In testimony whereof I have signed my name to this specification.

WILLIAM JAMES MYATT.